Patented Dec. 1, 1936

2,062,942

UNITED STATES PATENT OFFICE 2,062,942

ADHESIVE

Oreste Scalise and David Coleman,
New York, N. Y.

No Drawing. Application May 20, 1935,
Serial No. 22,488

2 Claims. (Cl. 134—23.8)

This invention relates to adhesives generally, and more particularly to types thereof for use in coating or sizing paper, textiles, or the like, and provides a method of producing the same, and it consists of the combinations and treatments herein described.

Heretofore, animal casein has been greatly used in producing adhesives of this nature. The use of this has the disadvantage of being very costly, however, and the variability of the matter as taken from its many sources does not provide a uniform product with which to work. Vegetable casein has also been used, but in the products herebefore made by use of this material in adhesives for coating and sizing paper, etc., it has been necessary to add chemicals at the paper plant or other manufactory before the product can be used as a size or coating in the manner described.

From the above, it will be discerned there is a demand in this industry for a sizing or coating material made from a vegetable protein that will not require treatment with chemicals at the place where the adhesive is to be used, and it is believed that the instant invention provides such an adhesive by making use of a flour produced from the bean of the lupine species of herbaceous plants (tribe Genisteae of the Order Leguminosae) as a base for adhesive sizes for materials generally and particularly as a substitute for animal casein and the heretofore known vegetable caseins, and combining this base with other materials constituting part of the involved method and resulting products.

In addition to the above advantage, it is an object of the invention to provide an adhesive of the type described that will not be open to the objections and disadvantages heretofore found in similar substances where animal casein and the known vegetable caseins have been used. These disadvantages are: (1) the production of too fragile a finish; (2) the necessity of either heat or moisture, or both, in mixing; (3) the creation of odoriferous products; (4) a high cost of production; (5), in the case of the vegetable casein, the necessity of the use of a proportionately large amount of the base because of low protein content; and (6) also in the case of the vegetable casein, the presence of more or less of a percentage of starch, which detracts from the waterproof quality of the product.

It is a further object to make, by use of the lupine bean in the manner described, a size which will produce a smooth coating on sheet materials sized therewith and bring about a high glazed finish on sheet materials when calendered. This is not believed to be true of sizes produced by vegetable caseins used in the past which are more or less lumpy and fibrous in character. The use of the lupine bean as a base, as is herein provided for, is believed to produce an equal or superior result to that of animal casein when used in a like capacity and it is subject to the same or similar reactions when compounded with the same chemicals. As a result, the adhesive here produced is superior to other adhesives for the particular purpose of sizing and has a much lower cost than has heretofore been possible.

Another object of the invention is to provide an adhesive coating or sizing for paper and other cellulose products, which coating or sizing is made from lupine flour, or the protein from the lupine bean extracted by soaking, crushing, colloidal milling or otherwise.

A further object of the invention resides in the making of a cellulose product or fabric coated with a size of which lupine flour is the principal ingredient.

For the accomplishment of the above and like ends then, the invention comprises the combination of materials or composition, of matter and the steps involved in the preparation of such product hereinafter described and defined in the claims.

In using the lupine bean in the invention, it is pulverized, preferably without removal of its natural oil content, until a very fine flour is produced with but few, if any, fibres present. This makes an excellent base for the purpose, containing just the right quantity of its natural oil to act as a fixing agent, a very high protein content and no starch.

This flour analyzes on the average as follows:—moisture 4.25%; oil 13.5%; protein 48.25%; ash 3.3%; crude fibre 4.0%; carbohydrates 26.70%; starch 0.0%; and other matter 0.72%; equals 100%.

The oil present in the flour analyzes as follows:—specific gravity 0.919%; iodine No. 96; saponification 190; free fatty acid (oleic) 3.0%; and unsaponified matter 1.3%.

It can be seen from the above that this natural ingredient of the Lupine bean forms a high grade fixing oil.

Using the lupine flour as a base, an adhesive is produced which has been very successful when used as a size by dry mixing the flour with other ingredients without spraying or other treatment at normal temperatures. The formula used in this preferred use of the flour is as follows:

| | Pounds |
|---|---|
| Lupine flour | 100 |
| Powdered caustic soda | 15 |
| Zinc sulphide pigment | 5 |
| Bentonite | 10 |
| Vegetable gelatine | 3 |
| Paraformaldehyde | 2 |

Some other alkali can be employed in place of the caustic soda, but best results have been achieved by the use of this compound. The vegetable gelatine which has been found to produce excellent results in the compound is a product of seaweed. The waterproofing can be secured by other means than the formaldehyde listed, by substituting sulphite of alumina, lime or borax.

The material produced by the above method and formula can be used at a paper plant or similar manufactory for sizing or coating without further chemical treatment, thus enabling shipment of the compound to the plant for use under simple directions. When used as a size, the manufacturer need only mix about 40 lbs. of the compound with 100 lbs. of clay and 4 or 5 parts of water. If preferred, however, the manufacturer can mix the compound made under this formula with satin white, blanc fixe, or pulp or aniline colors, without the necessity of introducing further chemicals to secure satisfactory results.

Another preferred formula which has proven highly successful in producing a sizing material with the desired qualities is as follows:

|  | Pounds |
|---|---|
| Lupine flour | 100 |
| Caustic soda | 15 |
| Vegetable gelatine | 3 |
| Bentonite | 2 |

These ingredients are to be dry mixed as in the first instance. The mixture, when completed for a sizing operation, can be used as indicated for the product of the first formula, or it can be sprayed with 5 lbs. of glycerine mixed with an equal amount of water and strained through an eighth inch mesh.

Still another very effective and satisfactory size can also be made under a formula as follows:

|  | Pounds |
|---|---|
| Lupine flour | 100 |
| Vegetable gelatine | 2 |
| Paraformaldehyde | 2 |

This compound can be used in like manner to that of the products of the first named formulas. Lime, in equal amount, may be substituted in any instance of the use of the paraformaldehyde, with equally good results in the finished materials.

It is to be noted that by cooking, as by boiling or steaming, a mixture of any of the compounds under any of these formulas, with the added clay and water, the colloidal properties thereof are appreciably improved, and, in any case, the size products of the several formulas are to be employed as coatings on sheet materials, or they are to be mixed, as by beating, directly into the pulps from which such materials are formed.

Materials produced by the above formulas will make a size having properties superior to sizes produced from the use of other vegetable caseins and equal, if not superior, to those produced from animal casein at a greatly reduced cost and having the additional advantage of containing all necessary ingredients used in the size with the exception of water and clay or the like.

It is understood that the foregoing formulas are typical and many variations can be made therein in the compounding of the instant adhesives, and that other modes of applying the principle of the invention may be employed instead of the one set forth, as well as changes as regards the process herein disclosed or the materials employed in carrying out such process provided stated constituents and steps or the equivalent of such are employed.

We claim:

1. A base compound for adhesives and the like, consisting of flour of the lupine bean, including the natural oil content thereof, 100 lbs., dry-mixed with powdered caustic soda 15 lbs., zinc sulphide pigment 5 lbs., bentonite 10 lbs., vegetable gelatine 3 lbs., and para-formaldehyde 2 lbs.

2. An adhesive-sizing composition, consisting of a base compound composed of flour of the lupine bean 100 lbs., powdered caustic soda 15 lbs., zinc sulphate pigment 5 lbs., bentonite 10 lbs., vegetable gelatine 3 lbs. and para-formaldehyde 2 lbs., admixed with clay and water in proportions of 40 lbs. of the compound to 100 lbs. of the clay and from 4 to 5 parts of water.

ORESTE SCALISE.
DAVID COLEMAN.